US012696253B2

(12) United States Patent　　(10) Patent No.:　US 12,696,253 B2
Tanaka et al.　　　　　　　　　(45) Date of Patent:　　Jul. 28, 2026

(54) WIRELESS COMMUNICATION DEVICE, WIRELESS COMMUNICATION TERMINAL, AND WIRELESS COMMUNICATION METHOD FOR TRANSMITTING/RECEIVING A PREAMBLE IN ACCORDANCE WITH A FIRST OR SECOND BANDWIDTH NARROWING MODE

(71) Applicant: Sony Group Corporation, Tokyo (JP)

(72) Inventors: Yusuke Tanaka, Tokyo (JP); Hiromasa Uchiyama, Tokyo (JP); Shigeru Sugaya, Tokyo (JP); Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 306 days.

(21) Appl. No.: 18/554,994

(22) PCT Filed: Jan. 27, 2022

(86) PCT No.: PCT/JP2022/003001
§ 371 (c)(1),
(2) Date: Oct. 12, 2023

(87) PCT Pub. No.: WO2022/224519
PCT Pub. Date: Oct. 27, 2022

(65) Prior Publication Data
US 2024/0205898 A1　　Jun. 20, 2024

(30) Foreign Application Priority Data

Apr. 19, 2021　　(JP) ................................. 2021-070097

(51) Int. Cl.
*H04W 72/0453*　　(2023.01)
*H04W 84/12*　　(2009.01)

(52) U.S. Cl.
CPC .............................. *H04W 72/0453* (2013.01)

(58) Field of Classification Search
CPC .............. H04L 5/0044; H04L 27/2603; H04L 27/2602; H04W 74/002; H04W 76/15;
(Continued)

(56) References Cited

U.S. PATENT DOCUMENTS 8,614,961 B1 * 12/2013 Katar ................ H04L 27/26136
　　　　　　　　　　　　　　　　　　　　370/252
9,929,844 B2 * 3/2018 Damnjanovic ... H04W 74/0816
(Continued)

FOREIGN PATENT DOCUMENTS

JP　　2011-015048 A　　1/2011
JP　　2018-157265 A　　10/2018
(Continued)

OTHER PUBLICATIONS

International Search Report and Written Opinion mailed on Apr. 26, 2022, received for PCT Application PCT/JP2022/003001, filed on Jan. 27, 2022, 09 pages including English Translation.

*Primary Examiner* — John Pezzlo
(74) *Attorney, Agent, or Firm* — XSENSUS LLP

(57)　　　　　ABSTRACT

A wireless communication device and corresponding method that causes a signal, in which at least a first portion of a preamble and a payload are narrowed in band, to be transmitted.

22 Claims, 14 Drawing Sheets

(58) Field of Classification Search
CPC ..... H04W 84/12; H04W 48/12; H04W 52/18;
H04W 72/0453; H04W 76/10
USPC ........................................ 370/252, 329, 430
See application file for complete search history.

(56) References Cited

U.S. PATENT DOCUMENTS

| | | | |
|---|---|---|---|
| 2009/0310558 A1* | 12/2009 | Koyanagi ............. | H04W 16/12 |
| | | | 370/330 |
| 2016/0164800 A1* | 6/2016 | Eitan ................... | H04L 27/2603 |
| | | | 370/389 |
| 2018/0167137 A1* | 6/2018 | Azizi ................... | H04B 7/2656 |
| 2019/0132844 A1* | 5/2019 | Lopez ....................... | H04L 1/00 |
| 2019/0373586 A1* | 12/2019 | Verma ................... | H04W 72/51 |
| 2020/0091944 A1* | 3/2020 | Sundström ............ | H04L 5/0044 |
| 2020/0137795 A1 | 4/2020 | Wang | |
| 2021/0195622 A1* | 6/2021 | Kim ................. | H04W 72/0453 |

FOREIGN PATENT DOCUMENTS

| JP | 2019-533343 A | 11/2019 |
|---|---|---|
| JP | 2020-036206 A | 3/2020 |
| WO | WO-2017079381 A1 | 5/2017 |
| WO | WO-2017160774 A1 | 9/2017 |
| WO | WO-2018204790 A1 | 11/2018 |
| WO | WO-2018208198 A1 | 11/2018 |

* cited by examiner

*FIG. 4*

New modulation portion1        New modulation portion2

| New-STF | New-LTF | New-SIG | Payload | PE |
|---------|---------|---------|---------|----|

FIG. 14

WIRELESS COMMUNICATION DEVICE, WIRELESS COMMUNICATION TERMINAL, AND WIRELESS COMMUNICATION METHOD FOR TRANSMITTING/RECEIVING A PREAMBLE IN ACCORDANCE WITH A FIRST OR SECOND BANDWIDTH NARROWING MODE

CROSS-REFERENCE TO RELATED APPLICATIONS

The present application is based on PCT filing PCT/JP2022/003001, filed Jan. 27, 2022, which claims priority from Japanese Patent Application No. 2021-070097, filed Apr. 19, 2021, the entire contents of each are incorporated herein by reference.

TECHNICAL FIELD

The present technology relates to a wireless communication device, a wireless communication terminal, and a wireless communication method, and more particularly relates to a wireless communication device, a wireless communication terminal, and a wireless communication method capable of improving frequency utilization efficiency.

BACKGROUND ART

In recent years, a situation where wireless communication in an unlicensed band is used has been expanded. For example, in a case where information is collected from a large number of sensors in a factory and a manufacturing apparatus is controlled as in Industrial IOT (Internet of Things), wireless communication in an unlicensed band is used.

In IEEE 802.11ax, by employing Up-Link Orthogonal Frequency-Division Multiple Access (UL OFDMA), frequency resources are narrowed in band and multiplexed, and information can be collected from a large number of sensors (hereinafter referred to as STA: Station) at the same time. Furthermore, by narrowing the frequency resources, the power density of a transmission signal is increased, and the communication range of the STA is expanded.

On the other hand, if the frequency band used by an access point (AP) that is a base station is not narrowed, the power density of the transmission signal remains as it is, and the communication range between the AP and the STA may be asymmetric.

On the other hand, IEEE 802.11ax employs a technology called extended range (ER) in which an AP transmits in half (for example, 10 MHz) of a conventional band. Thus, the power density of the transmission signal is increased, the communication range of the AP is widened, and the communication range can be made symmetric.

In the ER, in a case where transmission is performed in a half band, the band is defined as a high-range side of a conventional frequency. Therefore, after detecting that a received signal is a signal transmitted in the ER, the STA that has received the signal transmitted in the ER can receive a signal transmitted in the half band by receiving subsequent signals on the high-range side.

Note that, for example, Patent Document 1 describes a technique of allocating a frequency channel on the basis of a channel usage status and an attribute of a use terminal, but does not describe transmission and reception of signals narrowed in band in the same frequency channel.

CITATION LIST

Patent Document

Patent Document 1: Japanese Patent Application Laid-Open No. 2011-015048

SUMMARY OF THE INVENTION

Problems to be Solved by the Invention

However, in a case where the AP uses the ER, from the viewpoint of backward compatibility, the AP does not narrow the band of the head portion of a signal but transmits the signal in a bandwidth and a signal format for backward compatibility, and narrows the band from the middle of the signal.

At this time, the frequency band secured by the AP is 20 MHz, but the portion for actually transmitting valid information is 10 MHZ, and the frequency utilization efficiency decreases. In particular, in a use case in which a device that performs communication can be managed and controlled, such as a factory, the frequency utilization efficiency decreases due to unnecessary backward compatibility.

The present technology has been made in view of such a situation, and is intended to improve frequency utilization efficiency.

Solutions to Problems

A wireless communication device according to a first aspect of the present technology includes a communication control unit that causes a first signal, in which at least a first portion of a preamble and a payload are narrowed in band, to be transmitted.

A wireless communication terminal according to a second aspect of the present technology includes a communication control unit that causes a first signal, in which at least a first portion of a preamble and a payload are narrowed in band, to be received, the first signal being transmitted from a wireless communication device that is connected or possible to be connected.

In the first aspect of the present technology, a first signal, in which at least a first portion of a preamble and a payload are narrowed in band, is transmitted.

In the second aspect of the present technology, a first signal, in which at least a first portion of a preamble and a payload are narrowed in band, is received, the first signal being transmitted from a wireless communication device that is connected or possible to be connected.

BRIEF DESCRIPTION OF DRAWINGS

FIG. 4 is a diagram illustrating a configuration example of a second format of the beacon signal.

FIG. 14 is a block diagram illustrating a configuration example of a computer.

MODE FOR CARRYING OUT THE INVENTION

Hereinafter, a mode for carrying out the present technology will be described. The description will be given in the following order.

Figure 1:
FIG. 1 is a diagram illustrating a configuration example of a wireless communication system according to an embodiment of the present technology.

1. System and device configuration
2. First Embodiment
3. Second Embodiment
4. Others 1. Configuration of System and Device FIG. 1 is a diagram illustrating a configuration example of a wireless communication system according to an embodiment of the present technology. In FIG. 1, a broken line indicates connection by wireless communication, and a solid line indicates connection by wired communication.

The wireless communication system 1 of FIG. 1 includes AP1 and AP2 that are wireless communication devices operating as base stations, and STA1-1 to STA1-3 and STA2-1 to STA2-3 that are wireless communication devices operating as terminals.

Hereinafter, STA1-1 to STA1-3 are referred to as STA1 in a case where it is not particularly necessary to distinguish them, and STA2-1 to STA2-3 are referred to as STA2 in a case where it is not particularly necessary to distinguish them. Furthermore, AP1 and AP2 are referred to as an AP in a case where it is not particularly necessary to distinguish between them, and STA1 and STA2 are referred to as an STA in a case where it is not particularly necessary to distinguish between them. Note that the number of APs and STAs is an example, and is not limited to the example of FIG. 1.

STA1-1 to STA1-3 are connected to AP1 by wireless communication. STA2-1 to STA2-3 are connected to AP2 by wireless communication.

AP1 and AP2, and STA1-1 to STA1-3 and STA2-1 to STA2-3 operate in a terminal management environment area indicated as a managed area.

The terminal management environment area is an area in which wireless interference from the outside is cut off and all wireless communication devices operating in a certain frequency band transmit and receive signals using a format according to the present technology to be described later. Therefore, there is no wireless communication device that does not transmit a signal using the format according to the present technology in the terminal management environment area. In the format according to the present technology, at least a part of a preamble and a payload are narrowed in band.

To the wireless communication device operating in the terminal management environment area, some of communication parameters of the wireless communication device itself and other wireless communication devices are input in advance.

Furthermore, the wireless communication system 1 can include, as a component thereof, a central control device 10 that is connected to AP1 and AP2 and performs control and information exchange with respect to AP1 and AP2. In FIG. 1, the central control device 10 is provided outside the terminal management environment area, but the central control device 10 may be provided inside or outside the terminal management environment area.

The central control device 10 is configured as a specific device in FIG. 1. However, the central control device 10 may be mounted on a cloud or an edge that sends data collected by a terminal and a network on a terminal side in IoT to a line, or may constitute a part of an AP. Note that the central control device 10 may have a function of a frequency sharing system that shares a frequency, or may be connected to another device having the same function.

<Configuration Example of Wireless Communication Device>

Figure 2:
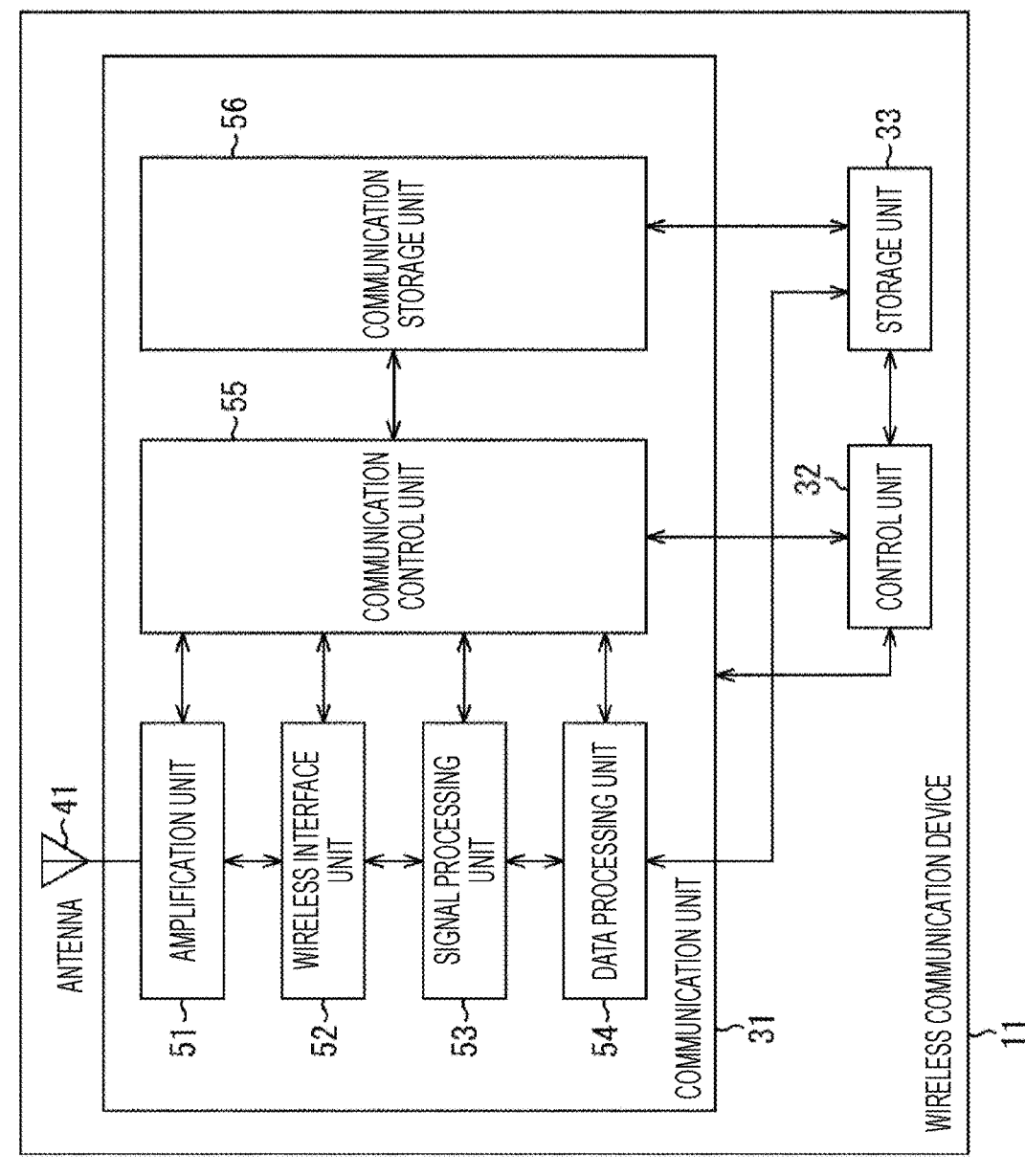
FIG. 2 is a block diagram illustrating a configuration example of a wireless communication device.

FIG. 2 is a block diagram illustrating a configuration example of a wireless communication device.

A wireless communication device 11 illustrated in FIG. 2 is a wireless communication device that operates as an AP or an STA.

The wireless communication device 11 includes a communication unit 31, a control unit 32, a storage unit 33, and an antenna 41.

The communication unit 31 transmits and receives data. The communication unit 31 includes an amplification unit 51, a wireless interface unit 52, a signal processing unit 53, a data processing unit 54, a communication control unit 55, and a communication storage unit 56.

At transmission, the amplification unit 51 amplifies an analog signal supplied from the wireless interface unit 52 to a predetermined electric power, and outputs the analog signal with the amplified electric power to the antenna 41. At reception, the amplification unit 51 amplifies an analog signal supplied from the antenna 41 to a predetermined power, and outputs the analog signal with amplified power to the wireless interface unit 52.

Part of the function of the amplification unit 51 may be included in the wireless interface unit 52. Furthermore, part of the function of the amplification unit 51 may be a component outside the communication unit 31.

At transmission, the wireless interface unit 52 converts a transmission symbol stream from the signal processing unit 53 into an analog signal, performs filtering, up-converting to a carrier frequency, and phase control, and outputs the analog signal after the phase control to the amplification unit 51.

At reception, the wireless interface unit 52 performs phase control, down-conversion, and reverse filtering on an analog signal supplied from the amplification unit 51, generates a reception symbol stream, which is the result of conversion into a digital signal, and outputs the reception symbol stream to the signal processing unit 53.

At transmission, the signal processing unit 53 performs encoding, interleave, and modulation or the like on a data unit supplied from the data processing unit 54, adds a physical header to the data unit and outputs the transmission symbol stream to the wireless interface unit 52.

At reception, the signal processing unit 53 analyzes the physical header of the reception symbol stream supplied from the wireless interface unit 52, performs demodulation, deinterleave, and decoding or the like on the reception symbol stream, and generates a data unit. The generated data unit is output to the data processing unit 54.

Note that the signal processing unit 53 performs complex channel characteristic estimation and a spatial separation process as necessary.

At transmission, the data processing unit 54 performs sequence management of data stored in the communication storage unit 56 and control information and management information received from the communication control unit 55. Furthermore, the data processing unit 54 generates a data unit by performing an encryption process or the like on the control information and the management information, and performs a channel access operation based on carrier sensing, addition of a media access control (MAC) header and addition of an error detection code to data to be transmitted, and a coupling process of multiple data units.

At reception, the data processing unit 54 performs a decoupling process of the MAC header of the received data unit, an analysis and an error detection, a retransmission request operation, analysis processing of the data unit, and reorder processing.

Note that the data processing unit 54 may include an individual data processing unit that performs an operation necessary for communication in a single frequency band and a common data processing unit that is connected to a plurality of individual data processing units and performs an operation common to communication in a plurality of frequency bands.

The communication control unit 55 controls operation of each unit in the communication unit 31 and information transmission between the units. Furthermore, the communication control unit 55 performs control to transfer, to the data processing unit 54, control information and management information notification of which is to be provided to another wireless communication device.

In a case where the wireless communication device 11 is an AP, the communication control unit 55 controls each unit to transmit a signal using the format according to the present technology. In a case where the wireless communication device 11 is an STA, the communication control unit 55 controls each unit to receive a signal using the format according to the present technology.

Note that, in a case where the wireless communication device 11 is an AP, the communication control unit 55 may control a wired communication unit (not illustrated) to control communication with the central control device 10.

The communication storage unit 56 holds information to be used by the communication control unit 55. Furthermore, the communication storage unit 56 holds data to be sent and received data.

The control unit 32 includes a central processing unit (CPU), a read only memory (ROM), a random access memory (RAM), and the like. The control unit 32 executes a program stored in the ROM or the like, and controls the communication unit 31 and the communication control unit 55. Furthermore, the control unit 32 may also perform part of the operation of the communication control unit 55. Moreover, the communication control unit 55 and the control unit 32 may be configured as one block.

The storage unit 33 holds information used by the communication unit 31 and the control unit 32. Furthermore, the storage unit 33 may also perform part of the operation of the communication storage unit 56. The storage unit 33 and the communication storage unit 56 may be configured as one block.

Note that, in a case where pluralities of antennas 41, amplification units 51, and wireless interface units 52 are provided, each plurality of antennas 41, amplification units 51, and wireless interface units 52 may form one set, and without being limited to two sets, three or more sets may be components of the wireless communication device 11. Furthermore, the communication unit 31 is achieved by one or more LSIs.

2. First Embodiment

As a first embodiment of the present technology, an example in which a certain AP transmits a narrowband signal in which at least a part of a preamble and a payload are narrowed in band in the terminal management environment area will be described. At that time, another AP multiplexes and transmits a narrowband signal transmitted by a certain AP on the basis of frequency information included in the narrowband signal.

Note that, although an example in which a beacon signal is transmitted as a narrowband signal will be described below, the transmission as a narrowband signal is not limited to the beacon signal and may be another frame.

In the first embodiment, two types of formats including a first format and a second format are used for transmission of the beacon signal. Then, the beacon signal narrowed in band in the second format is multiplexed with a portion narrowed in band of the beacon signal in the first format.

<Configuration Example of First Format of Beacon Signal>

Figure 3:
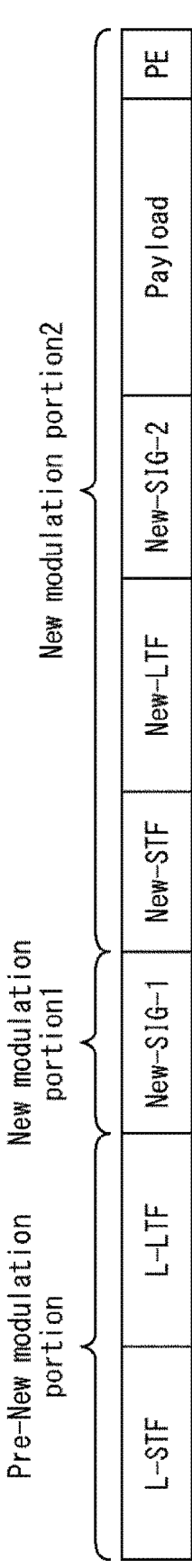
FIG. 3 is a diagram illustrating a configuration example of a first format of a beacon signal.

FIG. 3 is a diagram illustrating a configuration example of the first format of the beacon signal transmitted by the AP in the first embodiment.

The beacon signal in the first format includes a Pre-New modulation portion, a New modulation portion1, and a New modulation portion2.

The Pre-New modulation portion includes a legacy short training field (L-STF) and a legacy long training field (L-LTF). The New modulation portion1 includes New-SIG-1. The New modulation portion2 includes New-STF, New-LTF, New-SIG-2, Payload, and Packet Extension (PE).

Figure 5:
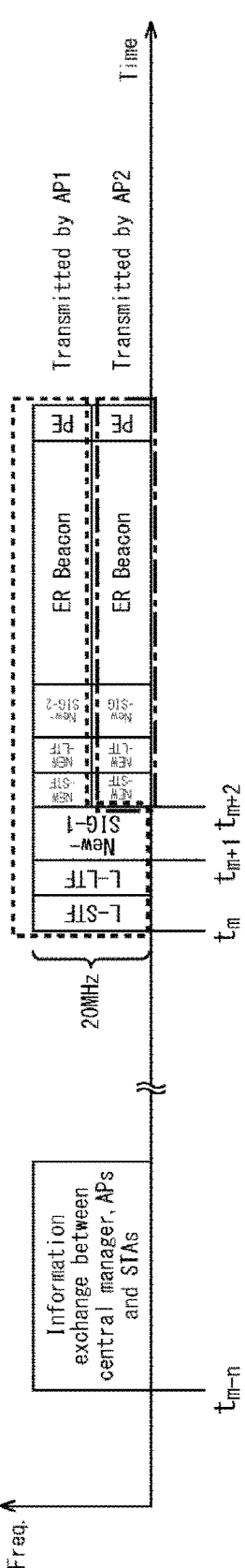
FIG. 5 is a diagram illustrating a timing chart of a first example of a transmission sequence of the beacon signal in a first embodiment.

Note that, among respective fields constituting the beacon signal in the first format, fields other than Payload and PE are the preamble. Further, in the beacon signal in the first format, as illustrated in FIG. 5 to be described later, New-STF, New-LTF, and New-SIG-2 are narrowed in band with Payload and PE as a part of the preamble. Furthermore, for convenience of description, only Payload will be described in a case where Payload is narrowed in band, but PE is also narrowed in band like Payload.

L-STF and L-LTF are known signal sequences for a device on the reception side to perform frequency offset estimation, timing synchronization, reception gain adjustment, and the like.

The Pre-New modulation portion is transmitted in the entire frequency band in which the AP has acquired the transmission right.

The Pre-New modulation portion is transmitted in units of 20 MHz. In a case where a frequency band exceeding 20 MHz is allocated, for example, in a case where a frequency band of 40 MHz is allocated, the Pre-New modulation portion is duplicated and transmitted every 20 MHz. For example, in a case where a frequency band of 80 MHz is allocated, the Pre-New modulation portion may be duplicated and transmitted every 20 MHZ, or may be transmitted in a portion other than a part of the frequency band of 80 MHZ.

New-SIG-1 includes information indicating an RU (Resource Unit) that is a part of a frequency band in which the AP obtains a transmission right and in which the New modulation portion2 is transmitted.

New-SIG-1 includes an RU in which the New modulation portion2 is transmitted and information indicating an OFDM signal format and a modulation coding method used in the New modulation portion2.

New-SIG-1 may include multiplexing permission information that permits another AP to multiplex from the middle of the present signal and transmit another signal. In a case where the multiplexing permission information is included, New-SIG-1 may include information indicating a type of another signal, information indicating an RU that transmits another signal, information regarding an identifier of an AP that uses the RU, information regarding a transmission power setting of the AP that uses the RU, and information regarding a transmission power setting of an AP transmitting the signal.

New-SIG-1 may include information indicating a format type used by the signal. New-SIG-1 may include a cyclic redundancy check (CRC). By including the CRC, error detection can be performed only by reception of New-SIG-1. That is, the device on the reception side can obtain the information included in New-SIG-1 at the stage of receiving up to the CRC of New-SIG-1.

Furthermore, New-SIG-1 may include a tail bit that ensures a time for length adjustment of New-SIG-1 and the device on the reception side to decode New-SIG-1 and perform operation setting.

The New modulation portion1 is transmitted in the same frequency band as the Pre-New modulation portion. For the New modulation portion1, the same OFDM signal format and modulation coding method as those of the Pre-New modulation portion, or the OFDM signal format and the modulation coding method used by the New modulation portion2 indicated by New-SIG-1 are used.

New-STF and New-LTF are known signal sequences for performing frequency offset estimation, timing synchronization, reception gain adjustment, channel estimation, and the like. The device on the reception side may repeatedly transmit New-STF a plurality of times to decrypt New-SIG-1 and secure time to perform operation setting. In a case where New-STF is repeated, New-SIG-1 may include information indicating the number of times of repeating or repeating New-STF.

New-SIG-2 may include information indicating a format type used by the signal. New-SIG-2 may include a communication specification version corresponding to the signal, a length of the signal, a length of an occupation period, a direction of communication, a network identifier, and the like.

Payload is a field including information of the beacon signal.

PE is a field for adjusting a length of a signal.

The New modulation portion2 is transmitted on an RU that transmits the New modulation portion2 indicated in New-SIG-1. For the New modulation portion2, the OFDM signal format and the modulation coding method used by the New modulation portion2 described in New-SIG-1 are used.

<Configuration Example of Second Format of Beacon Signal>

Figure 4:
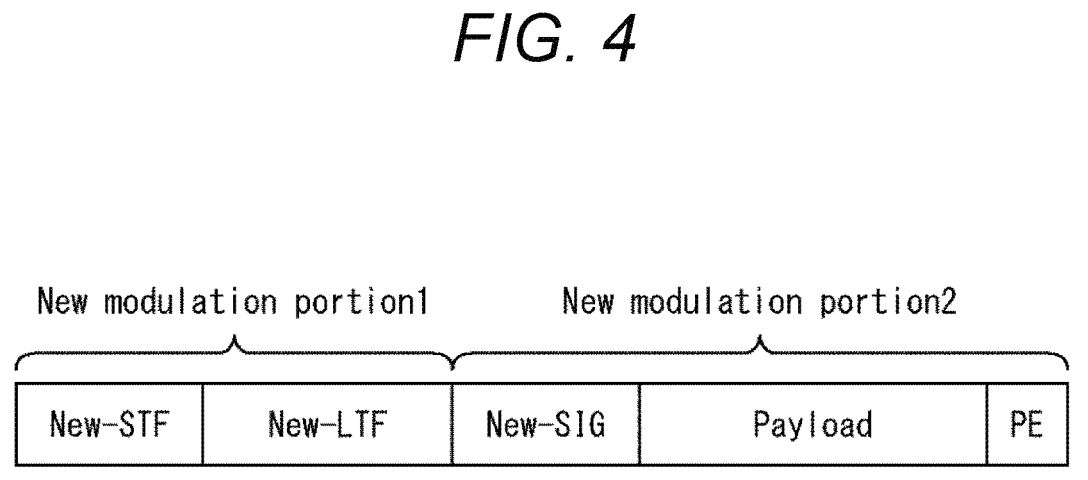

FIG. 4 is a diagram illustrating a configuration example of the second format of the beacon signal transmitted by the AP in the first embodiment.

The beacon signal in the second format includes the New modulation portion1 and the New modulation portion2.

The New modulation portion1 includes New-STF and New-LTF. The New modulation portion2 includes New-SIG, Payload, and PE.

Note that, among respective fields constituting the beacon signal in the second format, fields other than Payload and PE are the preamble. Further, in the beacon signal in the second format, the preamble is narrowed in band with Payload and PE as illustrated in FIG. 5 to be described later. Furthermore, for convenience of description, only Payload will be described in a case where Payload is narrowed in band, but PE is also narrowed in band like Payload.

New-STF, New-LTF, Payload, and PE include information similar to that in FIG. 3. New-SIG includes information similar to that of New-SIG-2 in FIG. 3.

The New modulation portion1 and the New modulation portion2 are transmitted by an RU that is a part of the frequency band allocated by New-SIG-1 of the beacon signal (FIG. 3) in the first format in which the signal is multiplexed. The RUs in which the New modulation portion1 and the New modulation portion2 are transmitted are the same.

Furthermore, the New modulation portion1 may be transmitted in an OFDM signal format that is the same as or different from that of the New modulation portion2. For example, an OFDM symbol may be short or a Guard Interval may be long in the OFDM signal format in order to reduce intersymbol interference when received by the STA. For example, in order to simplify reception operation and configuration of the STA, the OFDM symbol and the Guard Interval may be the same in the OFDM signal format. Note that an OFDM signal format and a modulation coding method known to the STA are used for the New modulation portion1.

Example 1 of Transmission Sequence of Beacon Signal

FIG. 5 is a diagram illustrating a timing chart of a first example of a transmission sequence of the beacon signal in the first embodiment.

In FIG. 5, the vertical axis represents frequency, and the horizontal axis represents time. The same applies to the subsequent timing charts.

At timing $t_{m-n}$ before AP1 transmits the beacon signal by using the first and second formats described above, the AP and the STA obtain information regarding transmission and reception of the beacon signal in advance.

The AP and the STA may obtain information regarding transmission and reception of the beacon signal from the central control device 10, or may obtain the information offline by a method such as manual input. Furthermore, the AP and the STA may transmit information regarding their own identifiers to the central control device 10, or may supply the information to the central control device 10 offline via a recording medium or the like. That is, the information regarding transmission and reception of the beacon signal is information obtained through information exchange between the central control device 10 and the AP and the STA, and is hereinafter referred to as information obtained through the information exchange.

The information obtained by the AP through the information exchange includes information regarding a plurality of frequency bands that are possibilities for transmitting the beacon signal. The information obtained by the AP through the information exchange may include information specifying a format used for the beacon signal. The information obtained by the AP through the information exchange may include information regarding positions, identifiers, and transmission powers of other APs. The information obtained by the AP through the information exchange may include information regarding the position of the STA. The information obtained by the AP through the information exchange may include information regarding security.

The information obtained by the AP through the information exchange may include information regarding wireless communication statuses of a plurality of possible frequency bands. In this case, the information obtained by the AP through the information exchange may be information indicating availability of a certain frequency band, information indicating whether or not use is recommended, or information regarding a communication congestion degree.

The information obtained by the AP through the information exchange may include information regarding constraints based on laws. In this case, the information obtained by the AP through the information exchange includes information regarding a maximum transmission power of a certain frequency band, necessity of carrier sensing, a back-off operation parameter, and a power detection threshold.

The information obtained by the AP through the information exchange may include information regarding a time when the terminal management environment area is valid and information regarding a current time, or information indicating whether the terminal management environment area is valid.

On the other hand, the information obtained by the STA through the information exchange may include information regarding the identifier of the AP to which the STA itself is to be connected. The information obtained by the STA through the information exchange may include information regarding security.

In FIG. 5, AP1 starts transmission of the beacon signal in any of a plurality of possible frequency bands among the information obtained through the above-described information exchange using the first format at timing $t_m$.

At that time, AP1 transmits the Pre-New modulation portion (L-STF and L-LTF) and the New modulation portion1 (New-SIG-1) of the beacon signal at timing $t_m$ to timing $t_{m+1}$ using a frequency band of 20 MHZ.

Thereafter, at timing $t_{m+2}$, AP1 transmits the New modulation portion2 (New-SIG, New-STF, New-LTF, Payload, and PE) by using an RU (for example, a high-range RU in the frequency band of 20 MHZ), the OFDM signal format, and the modulation coding method among the information obtained through the information exchange, and completes the transmission of the beacon signal.

After detecting the Pre-New modulation portion of the beacon signal transmitted from AP1 at timing $t_m$, AP2 receives New-SIG-1 of the New modulation portion1 at timing $t_{m+1}$ and acquires the multiplexing permission information and related information included in New-SIG-1.

Thereafter, using the second format, AP2 transmits the beacon signal at timing $t_{m+2}$ by an RU (for example, a low-range RU in the frequency band of 20 MHZ), the OFDM signal format, the modulation coding method, and the transmission power determined on the basis of the information obtained through the information exchange.

Note that in a case where New-SIG-1 includes information indicating repeating New-STF or the number of times of repeating New-STF, AP2 may transmit the beacon signal in accordance with the last transmission of New-STF.

On the other hand, each STA connected to AP1 and AP2 detects the Pre-New modulation portion of the beacon signal transmitted by AP1 at timing $t_m$, and then receives New-SIG-1 transmitted by AP1 at timing $t_{m+1}$.

Each STA1 connected to AP1 waits for reception of the beacon signal in an RU (high-range RU in the frequency band of 20 MHz) in which the New modulation portion2 included in New-SIG-1 is transmitted, and detects and receives the beacon signal at timing $t_{m+2}$.

Each STA2 connected to AP2 waits for reception of the beacon signal in an RU (low-range RU in the frequency band of 20 MHz) determined on the basis of the multiplexing permission information and the related information included in New-SIG-1, and detects and receives the beacon signal at timing $t_{m+2}$.

Note that, practically, a transmission timing of the AP and a reception timing of the STA are delayed due to communication, but are described at the same timing for convenience of description.

After the transmission of the beacon signal described above, another beacon signal may be transmitted, and at that time, information exchange with the central control device 10 may be performed. Furthermore, another beacon signal may be transmitted in a frequency band different from the transmission of the first beacon signal among a plurality of possible frequency bands obtained through the information exchange.

The frequency band of another beacon signal may be determined on the basis of the information regarding the wireless communication status among the information obtained through the information exchange. Furthermore, at the start of transmission of the beacon signal, an operation parameter may be set or changed on the basis of information regarding constraints based on the law.

In the above sequence, the transmission power of the beacon signal may be determined on the basis of position information of other APs and STAs among the information obtained through the information exchange. Furthermore, the transmission power may be determined on the basis of the information regarding the communication status received from the STA. In this case, the information obtained through the information exchange is reception RSSI information or the like of a signal transmitted from each AP.

Furthermore, in a case where the beacon signal is transmitted using the second format with respect to the beacon signal using the first format, the transmission power may be set on the basis of the information regarding the transmission power setting included in New-SIG-1 of the first format.

Furthermore, the transmission of the beacon signal using the first format and the second format described above may not be performed in all the beacon signals. For example, the transmission of the beacon signal using the first format and the second format described above may be performed only by the beacon signal including a delivery traffic indication map (DTIM), or may be performed only by the beacon signal not including a DTIM.

As described above, in the present technology, the signal narrowed in band by the high-range RU in the frequency band used for the beacon signal is transmitted from AP1, and the signal narrowed in band by the low-range RU is transmitted from AP2 at the same timing. Thus, it is possible to use a band that becomes usable by narrowing, and the frequency utilization efficiency can be improved.

Furthermore, in the present technology, a fixed frequency (RU) is not used as in the related art. Therefore, the signal narrowed in band (one side of a certain subcarrier) transmitted by AP2 can be orthogonal to the frequency (RU) (the other side of the certain subcarrier) used in the signal transmitted by AP1. Thus, it is possible to suppress an increase in interference due to band narrowing in the conventional method in which the band is narrowed and the power density is increased under constant power to expand the coverage range.

Example 2 of Sequence of Beacon Signal

Figure 6:
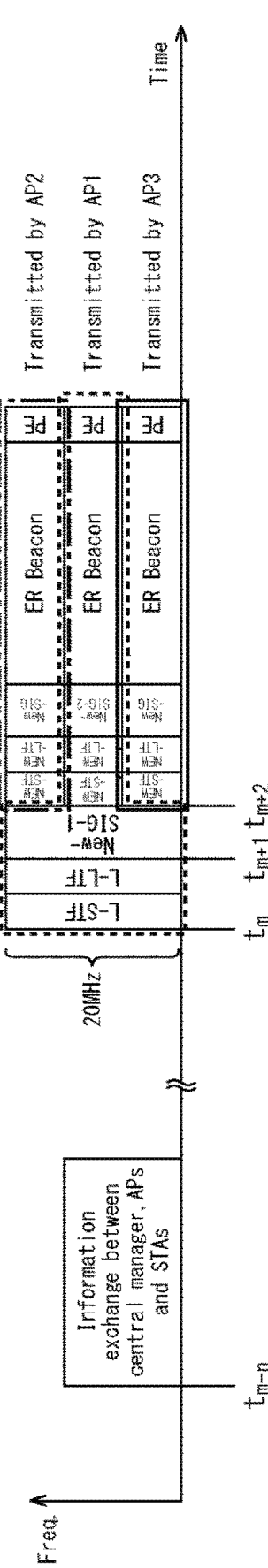
FIG. 6 is a diagram illustrating a timing chart of a second example of the transmission sequence of the beacon signal in the first embodiment.

FIG. 6 is a diagram illustrating a timing chart of a second example of the transmission sequence of the beacon signal in the first embodiment.

The timing chart of FIG. 6 is different from the timing chart of FIG. 5 in which two RUs are allocated in that three RUs are allocated.

In FIG. 6, a central RU in a frequency band of 20 MHz is allocated to AP1, a high-range RU is allocated to AP2, and a low-range RU is allocated to AP3.

That is, AP1 transmits the beacon signal up to the Pre-New modulation portion and the New modulation portion1 in the first format using the frequency band of 20 MHz at timing $t_m$ to timing $t_{m+1}$.

Thereafter, at timing $t_{m+2}$, AP1 transmits the New modulation portion by using an RU (RU at the center of the frequency band of 20 MHZ), the OFDM signal format, and the modulation coding method among the information obtained through the information exchange, and completes the transmission of the beacon signal.

After detecting the Pre-New modulation portion of the beacon signal transmitted from AP1 at timing $t_m$, AP2 and AP3 receive New-SIG-1 of the New modulation portion1 at timing $t_{m+1}$ and acquire the multiplexing permission information and the related information included in New-SIG-1.

Thereafter, using the second format, AP2 transmits the beacon signal at timing $t_{m+2}$ by an RU (high-range RU in the frequency band of 20 MHz), the OFDM signal format, the modulation coding method, and the transmission power determined on the basis of the information obtained through the information exchange.

Similarly, using the second format, AP3 transmits the beacon signal at timing $t_{m+2}$ by an RU (for example, the low-range RU in the frequency band of 20 MHZ), the OFDM signal format, the modulation coding method, and the transmission power determined on the basis of the information obtained through the information exchange.

On the other hand, each STA connected to AP1 to AP3 detects the Pre-New modulation portion of the beacon signal transmitted by AP1 at timing $t_m$, and then receives New-SIG-1 transmitted by AP1 at timing $t_{m+1}$.

Each STA1 connected to AP1 waits for reception of the beacon signal in an RU (for example, a mid-range RU in the frequency band of 20 MHz) in which the New modulation portion2 included in New-SIG-1 is transmitted, and detects and receives the beacon signal at timing $t_{m+2}$.

Each STA2 connected to AP2 waits for reception of the beacon signal in an RU (for example, the low-range RU in the frequency band of 20 MHZ) determined on the basis of multiplexing permission information and related information included in New-SIG-1, and detects and receives the beacon signal at timing $t_{m+2}$.

Each STA3 connected to AP3 waits for reception of the beacon signal in an RU (low-range RU of the frequency band) in which the New modulation portion2 included in New-SIG-1 is transmitted, and detects and receives the beacon signal at timing $t_{m+2}$.

Note that each of the three RUs does not necessarily need to be allocated to a different AP, and for example, a high-range RU and a low-range RU may be allocated to the same AP.

As described above, by increasing the allocation of RUs, it is possible to transmit signals from more APs, and the frequency utilization efficiency can be improved. Furthermore, by the RU narrowed in band, the power density of the signal is increased, and the SNR on the reception side can be improved. That is, it is possible to achieve a wider communication range and use a higher modulation coding method.

<Processing Example of AP>

Figure 7:
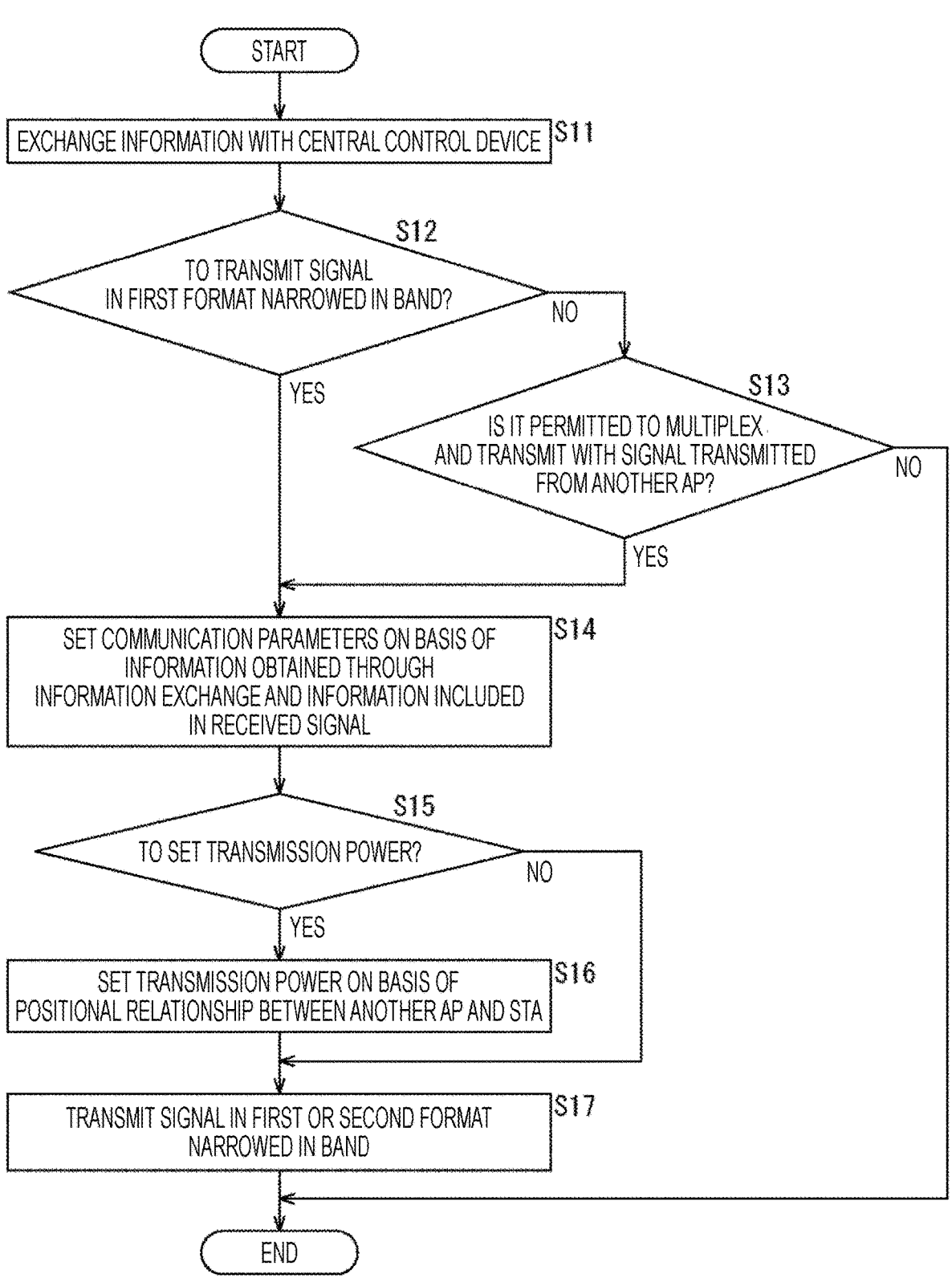
FIG. 7 is a flowchart describing processing of an AP.

FIG. 7 is a flowchart describing processing of the AP.

In step S11, the AP exchanges information with the central control device 10.

In step S12, the AP determines whether or not to transmit a signal in the first format in which at least a part of the preamble and the payload are narrowed in band. In a case where it is determined in step S12 to transmit the signal in the first format narrowed in band (in a case of AP1 in FIG. 5), the process proceeds to step S14.

In a case where it is determined in step S12 not to transmit the signal in the first format narrowed in band (in a case of AP2 in FIG. 5), the process proceeds to step S13.

In this case, the AP receives a signal in the first format narrowed in band, the signal being transmitted from another AP. In step S13, the AP determines whether or not it is permitted to multiplex and transmit with a signal transmitted from another AP on the basis of New-SIG-1 of the received signal. In a case where it is determined in step S13 that it is not permitted to multiplex and transmit with the signal transmitted from another AP (in the case of AP2 in FIG. 3), the process proceeds to step S14.

In step S14, in the case of AP1, the AP sets communication parameters on the basis of the information obtained through the information exchange with the central control device 10. In the case of AP2, the AP sets communication parameters on the basis of the information obtained through the information exchange with the central control device 10 and information included in the signal received from another AP (in the case of FIG. 5, AP1).

In step S15, the AP determines whether or not to set the transmission power. In a case where it is determined in step S15 to set the transmission power, the process proceeds to step S16.

In step S16, the AP sets the transmission power on the basis of the positional relationship between another AP and STA obtained through the information exchange with the central control device 10. That is, transmit power setting (Transmit Power Control) is performed on the basis of the positional relationship between another AP and STA. Thus, interference due to the band narrowing can be further reduced.

In a case where it is determined in step S15 not to set the transmission power, step S16 is skipped, and the process proceeds to step S17.

In step S17, in the case of AP1, the AP transmits a signal in the first format in which a part of the preamble and the payload are narrowed in band. In the case of AP2, the AP transmits a signal in the second format in which the preamble and the payload are narrowed in band. Thereafter, the process ends.

Furthermore, in a case where it is determined in step S13 that it is not permitted to multiplex and transmit with the signal transmitted from another AP, the processing ends.

<Processing Example of STA>

Figure 8:
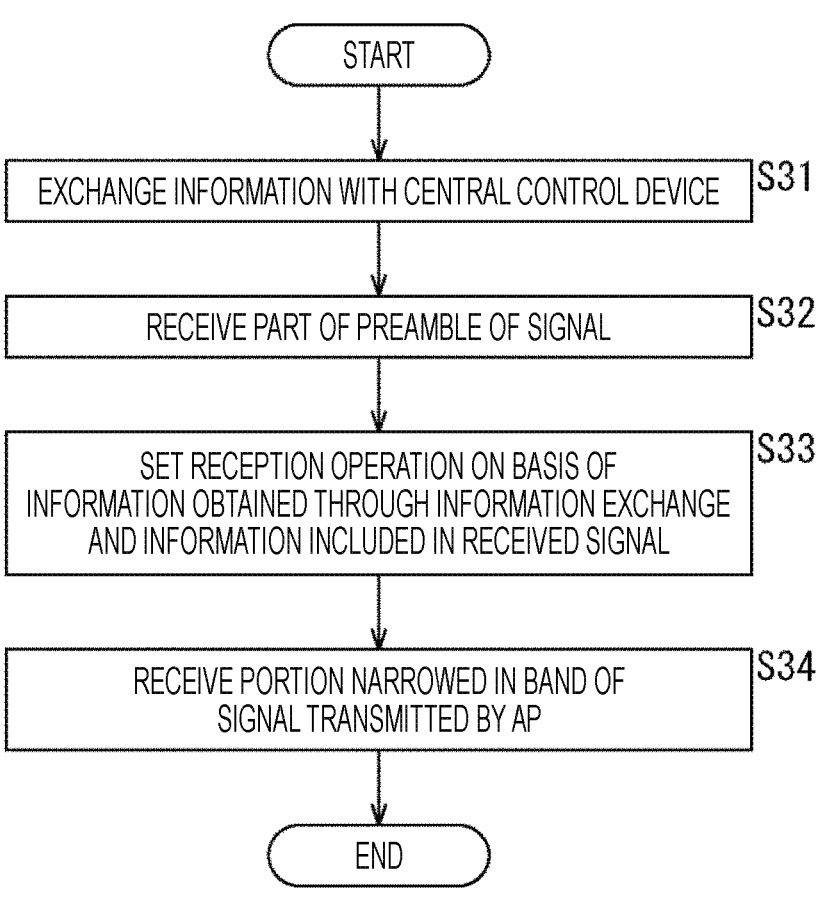
FIG. 8 is a flowchart describing processing of an STA.

FIG. 8 is a flowchart describing processing of the STA.

In step S31, the STA exchanges information with the central control device 10.

In step S32, the STA receives a part of the preamble of the signal (Pre-New modulation portion and New modulation portion1 in the first format of FIG. 5).

In step S33, the STA sets the reception operation on the basis of the information obtained through the information exchange with the central control device 10 and the information included in the received signal.

In step S34, the STA receives a portion narrowed in band (New modulation portion2 in the first format or New modulation portion1 and New modulation portion2 in the second format in FIG. 5) of the signal transmitted by the AP. Thereafter, the process ends.

<Information Exchange Between Central Control Device and AP>

Figure 9:
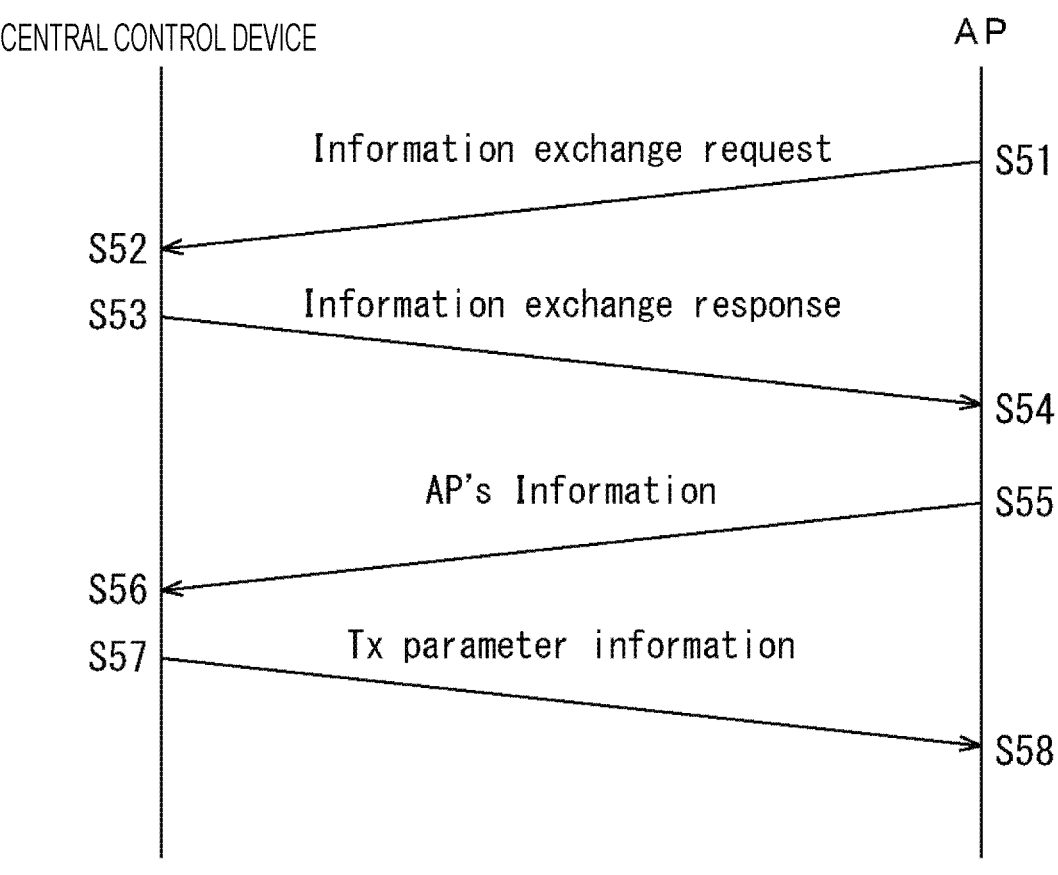
FIG. 9 is a diagram illustrating a sequence of information exchange between a central control device and the AP.

FIG. 9 is a diagram illustrating a sequence of information exchange between the central control device 10 and the AP.

In step S51, the AP transmits an information exchange request to the central control device 10.

In step S52, the central control device 10 receives the information exchange request transmitted from the AP.

In step S53, the central control device 10 transmits an information exchange response, which is a response to the received information exchange request, to the AP.

In step S54, the AP receives the information exchange response transmitted from the central control device 10.

In step S55, the AP transmits AP's Information (information of AP) to the central control device 10.

In step S56, the central control device 10 receives AP's Information transmitted from the AP.

In step S57, the central control device 10 transmits Tx parameter Information (information regarding transmission and reception of the beacon signal described above) to the AP.

In step S58, the AP receives Tx parameter Information transmitted from the central control device 10. Thereafter, the processing ends.

Note that the processing of FIG. 9 is performed using, for example, wired communication, but may be performed using wireless communication or may be performed by manual input by an administrator. In the case of the STA, processing similar to that in FIG. 9 is performed by manual input by the administrator, but may be performed using wired communication or wireless communication.

3. Second Embodiment

As a second embodiment of the present technology, an example in which a certain AP transmits a narrowband signal in the terminal management environment area will be described. At that time, a narrowband signal is transmitted by the AP on the basis of frequency information obtained through the information exchange with the central control device 10.

In the second embodiment, two types of formats are used for transmission of the beacon signal. Unlike the case of the first embodiment, each of the formats is used independently.

In the second embodiment, one of the formats used by the AP for transmitting the beacon signal is the same as the second format illustrated in FIG. 4 in the first embodiment. In this case, the New modulation portion1 and the New modulation portion2 are transmitted on an RU that is a part of a frequency band allocated in advance.

In the second embodiment, one of the formats used by the AP for transmitting the beacon signal is a third format described below.

<Configuration Example of Third Format of Beacon Signal>

Figure 10:
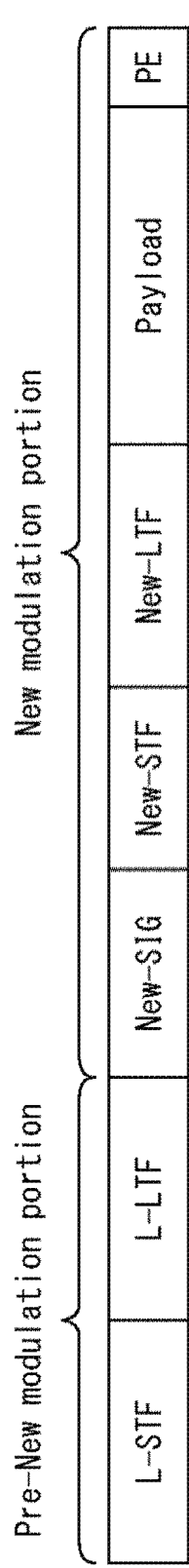
FIG. 10 is a diagram illustrating a configuration example of a third format of the beacon signal.

FIG. 10 is a diagram illustrating a configuration example of the third format of the beacon signal transmitted by the AP in the second embodiment.

The beacon signal in the third format includes the Pre-New modulation portion and the New modulation portion.

The Pre-New modulation portion includes L-STF and L-LTF. The New modulation portion includes New-SIG, New-STF, New-LTF, Payload, and PE.

Figure 11:
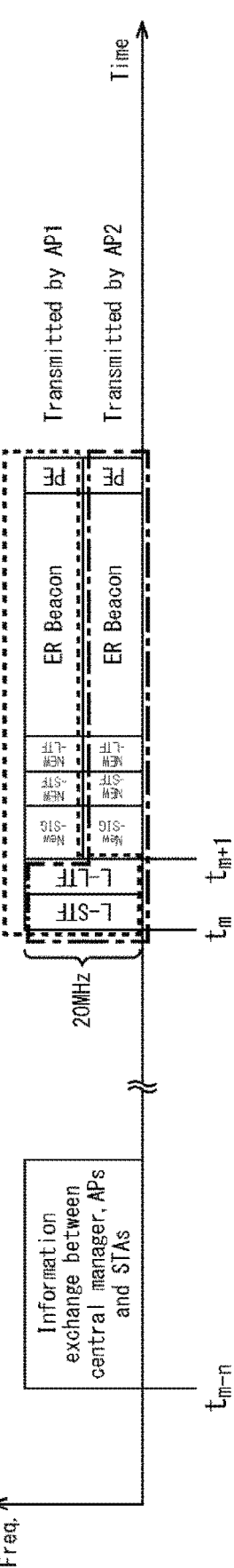
FIG. 11 is a diagram illustrating a timing chart of a first example of a transmission sequence of the beacon signal in a second embodiment.

Note that, among respective fields constituting the beacon signal in the third format, fields other than Payload and PE are the preamble. Further, in the beacon signal in the third format, the preamble is narrowed in band with Payload and PE as illustrated in FIG. 11 to be described later. Furthermore, for convenience of description, only Payload will be described in a case where Payload is narrowed in band, but PE is also narrowed in band like Payload.

The configurations of the respective fields of L-STF, L-LTF, New-STF, New-LTF, Payload, and PE are similar to the configurations of the respective fields in FIG. 3. The configuration of New-SIG is similar to the configuration of New-SIG-2 in FIG. 4.

The Pre-New modulation portion is transmitted in the entire frequency band in which the AP obtains the transmission right or is allocated in advance. Other configurations of the Pre-New modulation portion are similar to those of FIG. 3.

The New modulation portion is transmitted in a frequency band allocated in advance. Other configurations of the New modulation portion are similar to those of the New modulation portion2 in FIG. 3.

Example 1 of Transmission Sequence of Beacon Signal

FIG. 11 is a diagram illustrating a timing chart of a first example of a transmission sequence of the beacon signal in the second embodiment.

FIG. 11 illustrates an example in which the third format described above with reference to FIG. 10 is used.

As in the case of FIG. 5, the AP and the STA exchange information with the central control device 10 at timing $t_{m-n}$ before AP1 transmits the beacon signal.

A difference from the case of FIG. 3 is that information regarding the OFDM signal format and the modulation coding method used by the RU in which the New modulation portions 1 and 2 are transmitted and information regarding the transmission timing of the beacon signal are added to the information obtained by the AP through the information exchange. Other configurations are similar to those in the case of FIG. 3.

Furthermore, the information obtained by the STA through the information exchange includes an identifier of the AP, the RU in which the New modulation portion is transmitted by the AP, and a combination of the information regarding the OFDM signal format and the modulation coding method used for the New modulation portion.

The information obtained by the STA through the information exchange may include information regarding constraints based on laws. In this case, the information obtained by the STA through the information exchange includes information regarding a maximum transmission power of a certain frequency band, necessity of carrier sensing, a back-off operation parameter, and a power detection threshold.

Next, AP1 and AP2 start transmission of the beacon signal at timing $t_m$ which is the transmission timing obtained through the information exchange in any of a plurality of possible frequency bands obtained through the information exchange.

AP1 and AP2 transmit beacon signals up to the Pre-New modulation portion (L-STF and L-LTF) using the frequency band of 20 MHz at timing $t_m$.

AP1 and AP2 transmit the New modulation portion (New-SIG, New-STF, New-LTF, Payload, and PE) at the later timing $t_{m+1}$. At that time, an RU (for example, the high-range or low-range RU in the frequency band of 20 MHZ), the OFDM signal format, and the modulation coding method obtained through the information exchange are used. There-after, the transmission of the beacon signal is completed.

Each STA connected to AP1 and AP2 receives the Pre-New modulation portion of the beacon signal transmitted by AP1 and AP2 at timing $t_m$, and receives the beacon signal at the later timing $t_{m+1}$ by the RU obtained through the information exchange and used by the AP to which the STA itself is connected.

Example 2 of Sequence of Beacon Signal

Figure 12:
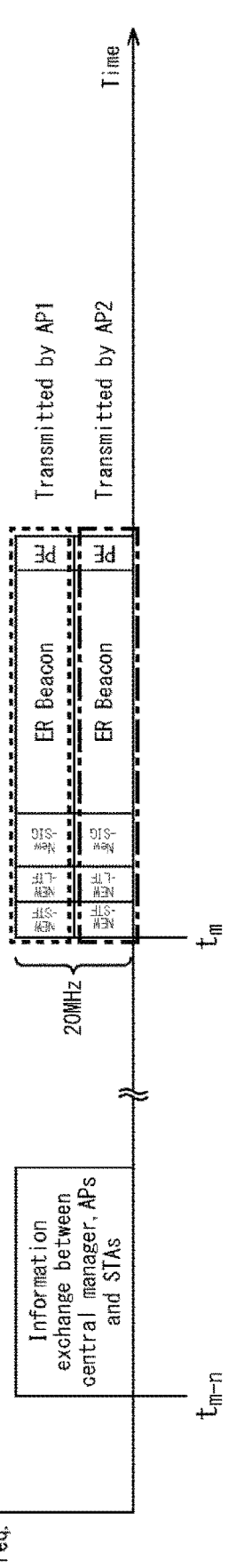
FIG. 12 is a diagram illustrating a timing chart of a second example of the transmission sequence of the beacon signal in the second embodiment.

FIG. 12 is a diagram illustrating a timing chart of a second example of the transmission sequence of the beacon signal in the second embodiment.

FIG. 12 illustrates an example in which the second format described above with reference to FIG. 4 is used.

As in the case of FIG. 11, the AP and the STA exchange information with the central control device 10 at timing $t_{m-n}$ before AP1 transmits the beacon signal.

The information obtained by the AP through the information exchange may not include the information regarding the transmission timing of the beacon signal. The other configurations are similar to those in FIG. 11.

Next, AP1 and AP2 start transmission of the beacon signal by using an RU (for example, the high-range or low-range RU in the frequency band of 20 MHZ), the OFDM signal format, and the modulation coding method obtained through the information exchange in any of a plurality of possible frequency bands obtained through the information exchange.

Note that, in FIGS. 11, AP1 and AP2 start the transmission at timing $t_m$ and end the transmission at the same timing, but the transmission start and end timings may be independent from each other. The other processing is similar to the processing in FIG. 10.

Each STA connected to AP1 and AP2 waits for reception of the beacon signal, detects a beacon signal, and receives the beacon signal in an RU (the high-range or low-range RU in the frequency band of 20 MHZ) obtained through the information exchange and used by the AP to which the STA itself is connected.

<Processing Example of AP>

Figure 13:
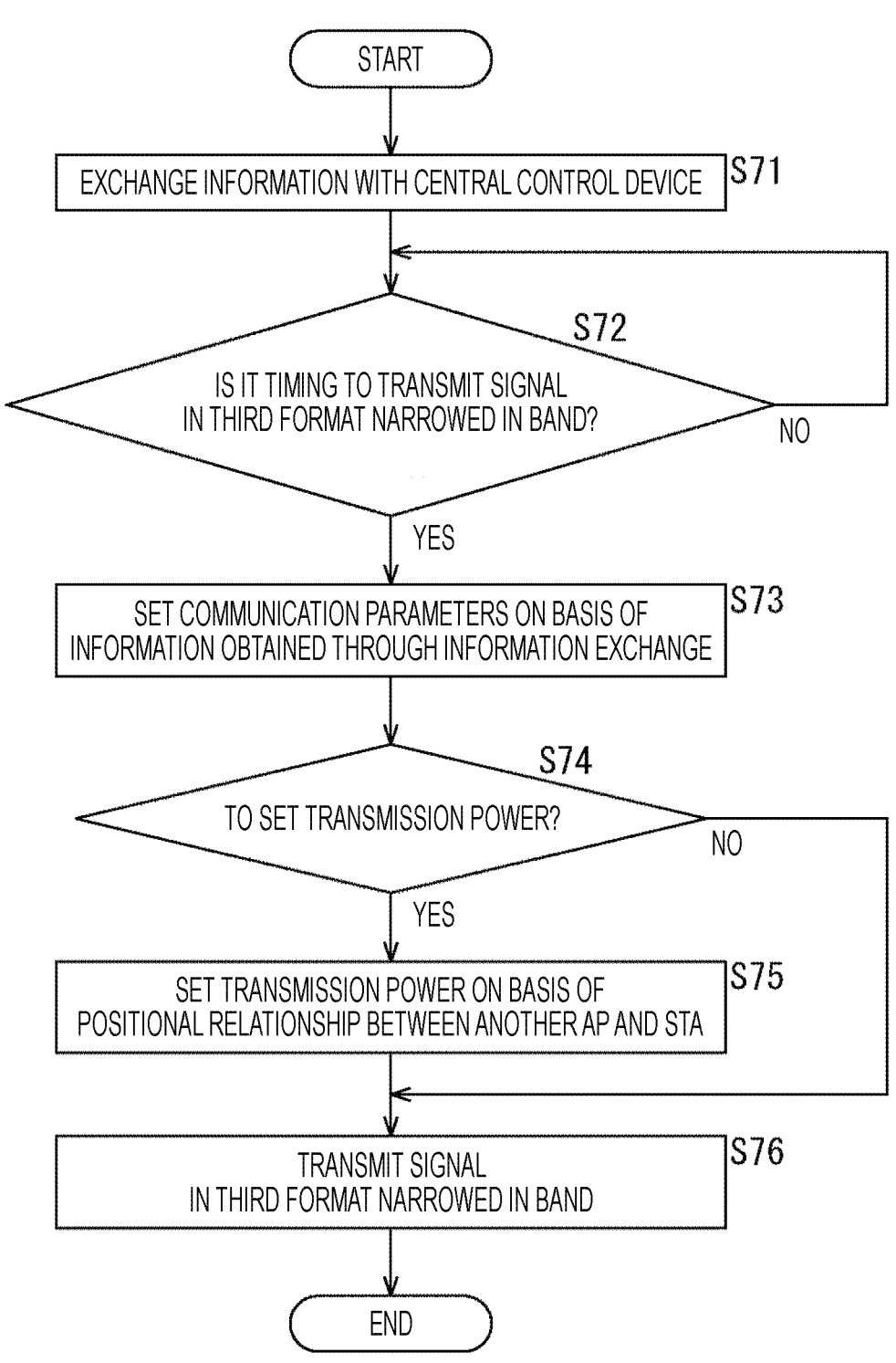
FIG. 13 is a flowchart describing processing of the AP.

FIG. 13 is a flowchart describing processing of the AP.

Note that, in FIG. 13, a case where the third format is used for signal transmission will be described, but processing similar to that in FIG. 13 is also performed in a case where the second format is used.

In step S71, the AP exchanges information with the central control device 10.

In step S72, the AP waits until it is determined that it is timing to transmit a signal in the third format in which a part of the preamble and the payload are narrowed in band. In a case where it is determined in step S72 that it is timing to transmit a signal in the third format narrowed in band, the process proceeds to step S73.

In step S73, the AP sets communication parameters on the basis of information obtained through the information exchange with the central control device 10. In the case of AP2, the AP sets communication parameters on the basis of the information obtained through the information exchange with the central control device 10 and the information included in the signal received from another AP.

In step S74, the AP determines whether or not to set the transmission power. In a case where it is determined in step S74 to set the transmission power, the process proceeds to step S75.

In step S75, the AP sets the transmission power on the basis of the positional relationship between another AP and STA obtained through the information exchange with the central control device 10.

In a case where it is determined in step S74 not to set the transmission power, step S75 is skipped, and the process proceeds to step S76.

In step S76, the AP transmits a signal (New modulation portion in FIG. 11) in the third format in which a part of the preamble and the payload are narrowed in band. Thereafter, the process ends.

Note that the processing of the STA in the second embodiment is similar to the processing of the STA in the first embodiment described above with reference to FIG. 8 except a difference that the reception operation is set on the basis of only the information obtained through the information exchange with the central control device 10 in step S32.

Furthermore, the sequence of the information exchange between the central control device 10 and the AP in the second embodiment is processing similar to the sequence of the information exchange between the central control device 10 and the AP in the first embodiment described above with reference to FIG. 9.

Note that, in the above description, an example in which the AP transmits the beacon signal has been described, but the signal transmitted using the present technology is not limited to the beacon signal. For example, the signal transmitted using the present technology may be a signal transmitted to a broadcast destination. Furthermore, the signal transmitted using the present technology may be a Data frame, a Trigger frame, a Multi-STA Block Ack (BA) frame, a Null Data Packet (NDP) announcement frame, an NDP frame, or the like specified in IEEE 802.11.

According to the first embodiment and the second embodiment of the present technology, it is possible to select and implement an appropriate wireless communication operation on the basis of a wireless communication system existing around or operating around. Furthermore, in an environment where there is no wireless communication system that needs backward compatibility, it is possible to select and perform a communication operation that does not have backward compatibility and has high communication efficiency.

4. Other

Effects of Present Technology

As described above, in the present technology, a first signal in which at least a first portion of the preamble and the payload are narrowed in band is transmitted.

Therefore, it is possible to use a band that becomes usable by narrowing, and the frequency utilization efficiency can be improved.

Furthermore, according to the present technology, since a conventional fixed frequency (RU) is not used, for example, a signal narrowed in band transmitted by AP2 can be orthogonal to a frequency (RU) used in a signal transmitted by AP1. Thus, it is possible to suppress an increase in interference due to band narrowing in the conventional method in which the band is narrowed and the power density is increased under constant power to expand the coverage range.

Moreover, in the present technology, transmission power setting is performed on the basis of position information of the AP or the STA. Thus, interference due to the band narrowing can be further reduced.

As described above, it is possible to expand the communication range while improving the frequency utilization efficiency and suppressing interference.

<Configuration Example of Computer>

The series of processes described above can be executed by hardware or can be executed by software. In a case where the series of processes is executed by software, a program constituting the software is installed from a program recording medium to a computer incorporated in dedicated hardware, a general-purpose personal computer, or the like.

Figure 14:
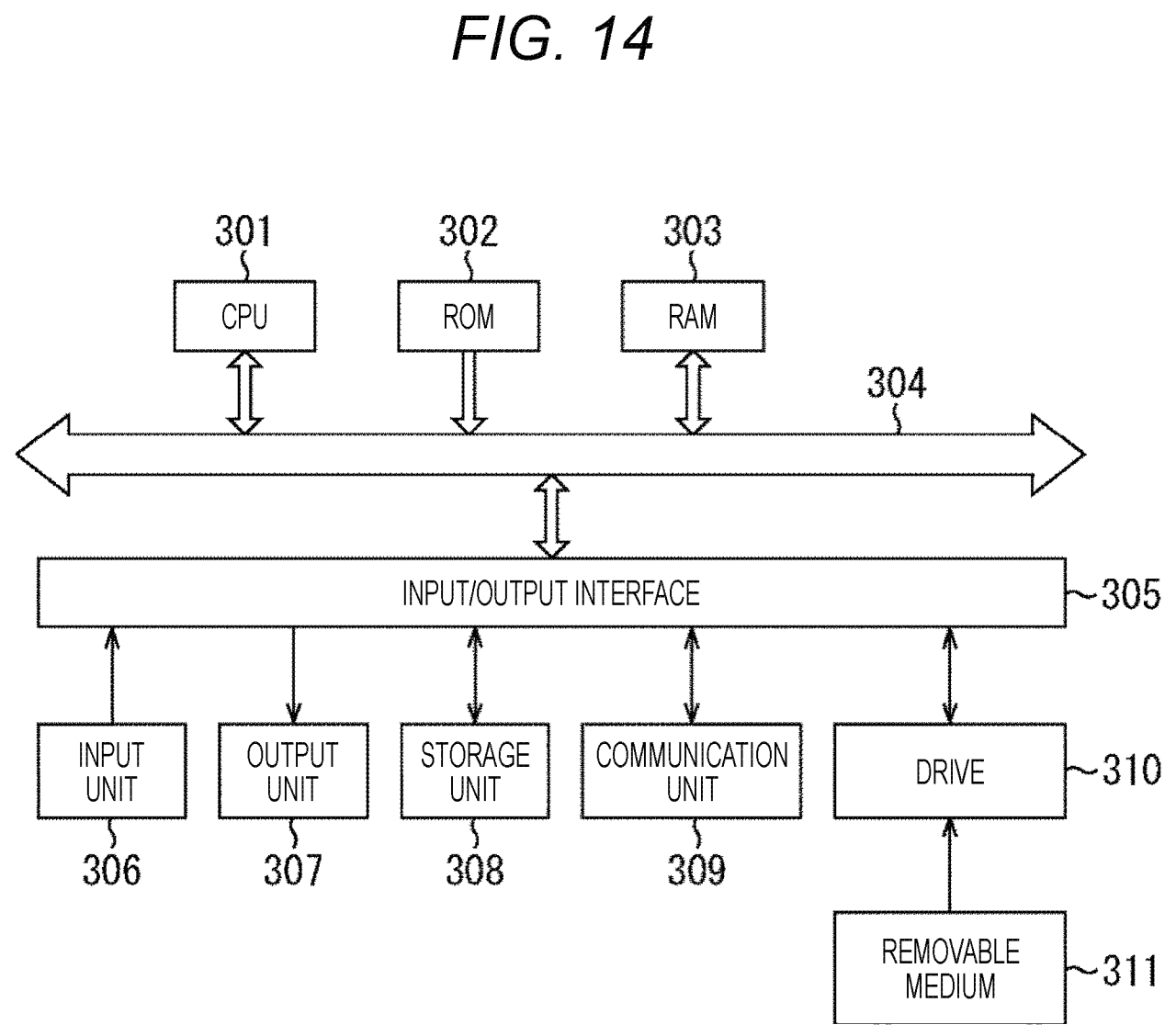

FIG. 14 is a block diagram illustrating an example of a hardware configuration of a computer that executes the series of processes described above according to a program.

A central processing unit (CPU) 301, a read only memory (ROM) 302, and a random access memory (RAM) 303 are mutually connected by a bus 304.

An input/output interface 305 is also connected to the bus 304. An input unit 306 including a keyboard, a mouse, and the like, and an output unit 307 including a display, a speaker, and the like are connected to the input/output interface 305. Furthermore, a storage unit 308 including a hard disk, a nonvolatile memory, or the like, a communication unit 309 including a network interface or the like, and a drive 310 that drives a removable medium 311 are connected to the input/output interface 305.

In the computer configured as described above, for example, the CPU 301 loads the program stored in the storage unit 308 into the RAM 303 via the input/output interface 305 and the bus 304 and executes the program, and thus the series of processes described above is performed.

The program to be executed by the CPU 301 is provided, for example, by being recorded on the removable medium 311 or via a wired or wireless transmission medium such as a local area network, the Internet, or digital broadcasting, and is installed in the storage unit 308.

Note that the program executed by a computer may be a program that is processed in time series in the order described in the present specification or a program that is processed in parallel or at necessary timings such as when a call is made.

Note that in the present specification, a system means a set of a plurality of constituents (devices, modules (components), and the like), and it does not matter whether or not all the constituents are in the same housing. Therefore, both of a plurality of devices housed in separate housings and connected via a network and a single device in which a plurality of modules is housed in one housing are systems.

Furthermore, the effects described in the present specification are merely examples and not limiting, and there may also be other effects.

The embodiment of the present technology is not limited to the above-described embodiment, and various modifications can be made without departing from the scope of the present technology.

For example, the present technology may be configured as cloud computing in which one function is shared by a plurality of devices through a network for processing in cooperation.

Furthermore, each step described in the above-described flowchart can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

<Example of Configuration Combination>

The present technology can also have the following configurations.

(1)

A wireless communication device, including:

a communication control unit that causes a first signal, in which at least a first portion of a preamble and a payload are narrowed in band, to be transmitted.

(2)

The wireless communication device according to (1) above, in which the communication control unit causes the first signal to be transmitted on the basis of information regarding first transmission and reception obtained by exchange with a central control device.

(3)

The wireless communication device according to (2) above, in which the information regarding the first transmission and reception includes at least one of a frequency band of the first signal and information regarding the frequency band, information regarding a modulation method and a coding method of the first signal, or information regarding a transmission power setting of the first signal.

(4)

The wireless communication device according to (1) or (2) above, in which the first signal includes the first portion of the preamble and the payload that are narrowed in band, and a second portion of the preamble that is not narrowed in band.

(5)

The wireless communication device according to (4) above, in which the second portion of the preamble includes information regarding second transmission and reception including information regarding permission to multiplex and transmit with the first signal.

(6)

The wireless communication device according to (5) above, in which the information regarding the second transmission and reception includes at least one of a frequency band of the first signal and information regarding the frequency band, information regarding a modulation method and a coding method of the first signal, or information regarding a transmission power setting of the first signal.

(7)

The wireless communication device according to (1) above, in which the first signal includes the preamble and the payload narrowed in band.

(8)

The wireless communication device according to (7) above, in which the communication control unit causes the first signal to be transmitted on the basis of information regarding second transmission and reception included in a second signal transmitted from another wireless communication device.

(9)

The wireless communication device according to (8) above, in which the information regarding the second transmission and reception includes information regarding permission to multiplex and transmit with the second signal, and the communication control unit causes the first signal to be multiplexed and transmitted with the second signal in a case where it is permitted to multiplex and transmit with the second signal.

(10)

The wireless communication device according to (8) above, in which the information regarding the second transmission and reception includes at least one of a frequency band of the first signal and information regarding the frequency band, information regarding a modulation method and a coding method of the first signal, or information regarding a transmission power setting of the first signal.

(11)

The wireless communication device according to any one of (1) to (10) above, in which the communication control unit sets transmission power of the first signal on the basis of a positional relationship between surrounding wireless communication devices.

(12)

A wireless communication method, including:

causing, by a wireless communication device, a first signal, in which at least a first portion of a preamble and a payload are narrowed in band, to be transmitted.

(13)

A wireless communication terminal, including:

a communication control unit that causes a first signal, in which at least a first portion of a preamble and a payload are narrowed in band, to be received, the first signal being transmitted from a wireless communication device that is connected or possible to be connected.

(14)

The wireless communication terminal according to (13) above, in which the communication control unit causes the first signal to be received on the basis of information regarding first transmission and reception obtained by exchange with a central control device.

(15)

The wireless communication terminal according to (14) above, in which the information regarding the first transmission and reception includes at least one of a frequency band of the first signal and information regarding the frequency band, or information regarding a modulation method and a coding method of the first signal.

(16)

The wireless communication terminal according to (13) or (14) above, in which the first signal includes the first portion of the preamble and the payload that are narrowed in band, and a second portion of the preamble that is not narrowed in band.

(17)

The wireless communication terminal according to (14) above, in which the first signal includes the preamble and the payload narrowed in band.

(18)

The wireless communication terminal according to (17) above, in which the communication control unit causes the first signal to be received on the basis of information regarding second transmission and reception included in a second signal transmitted from another wireless communication device.

(19)

The wireless communication terminal according to (18) above, in which the information regarding the second transmission and reception includes at least one of a frequency band of the first signal and information regarding the frequency band, or information regarding a modulation method and a coding method of the first signal.

(20)

A wireless communication method, including:

causing, by a wireless communication terminal, a first signal, in which at least a first portion of a preamble and a payload are narrowed in band, to be received, the first signal being transmitted from a wireless communication device that is connected or possible to be connected.

REFERENCE SIGNS LIST

11 Wireless communication device
31 Communication unit
54 Data processing unit
55 Communication control unit
56 Communication storage unit

The invention claimed is:

1. A wireless communication device, comprising:

a communication control circuit configured to:

make a determination whether to transmit a first signal in a first transmission and reception mode or in a second transmission and reception mode via a specific frequency band, wherein in the first transmission and reception mode, the first signal is transmitted based only on first information that is obtained via an exchange with a central control device, or wherein in the second transmission and reception mode, the first signal is transmitted based on the first information that is obtained from the central control device as well as second information that is received from another wireless communication device, wherein, in the first transmission and reception mode:

a first portion of a first preamble is concatenated with a first payload to form a first part of the first signal, the first part assigned to a first subband of the specific frequency band, a second portion of the first preamble of the first signal forms a second part of the first signal, the second part occupying all of the specific frequency band, and an end of the second part of the first signal is concatenated with a front of the first part of the first signal, wherein, in the second transmission and reception mode, an entirety of a second preamble of the first signal is concatenated with a second payload of the first signal, the concatenated second preamble and second payload assigned to a second subband of the specific frequency band different from the first subband, and transmit the first signal based on the determination.

2. The wireless communication device according to claim 1, wherein, when the first information indicates that the first signal is to be transmitted in the first transmission and reception mode, the first information further indicates at least one of:

the first subband, a modulation method and a coding method of the first transmission and reception mode, or a transmission power setting of the first transmission and reception mode.

3. The wireless communication device according to claim 2, wherein the transmission power setting of the first transmission and reception mode is based on a positional relationship between surrounding wireless communication devices.

4. The wireless communication device according to claim 1, wherein, when the first information indicates that the first signal is not to be transmitted in the first transmission and reception mode, the communication control circuit determines, based on the second information, whether or not to transmit the first signal in the second transmission and reception mode.

5. The wireless communication device according to claim 4, wherein, when the second information indicates that the first signal is permitted to be transmitted in the second transmission and reception mode, the second information further indicates at least one of:

the second subband, a modulation method and a coding method of the second transmission and reception mode, or a transmission power setting of the second transmission and reception mode.

6. The wireless communication device according to claim 5, wherein the transmission power setting of the second transmission and reception mode is based on a positional relationship between surrounding wireless communication devices.

7. The wireless communication device according to claim 1, wherein a format of the concatenated first preamble and first payload is the same as a format of the concatenated second preamble and second payload.

8. A wireless communication method performed by a wireless communication device, the wireless communication method comprising:

making a determination whether to transmit a first signal in a first transmission and reception mode or in a second transmission and reception mode via a specific frequency band, wherein in the first transmission and reception mode, the first signal is transmitted based only on first information that is obtained via an exchange with a central control device, or wherein in the second transmission and reception mode, the first signal is transmitted based on the first information that is obtained from the central control device as well as second information that is received from another wireless communication device, wherein, in the first transmission and reception mode:

a first portion of a first preamble is concatenated with a first payload to form a first part of the first signal, the first part assigned to a first subband of the specific frequency band, a second portion of the first preamble of the first signal forms a second part of the first signal, the second part occupying all of the specific frequency band, and an end of the second part of the first signal is concatenated with a front of the first part of the first signal, wherein, in the second transmission and reception mode, an entirety of a second preamble of the first signal is concatenated with a second payload of the first signal, the concatenated second preamble and second payload assigned to a second subband of the specific frequency band different from the first subband, and transmitting the first signal based on the determination.

9. The wireless communication method according to claim 8, wherein, when the first information indicates that the first signal is to be transmitted in the first transmission and reception mode, the first information further indicates at least one of:

the first subband, a modulation method and a coding method of the first transmission and reception mode, or a transmission power setting of the first transmission and reception mode.

10. The wireless communication method according to claim 9, wherein the transmission power setting of the first transmission and reception mode is based on a positional relationship between surrounding wireless communication devices.

11. The wireless communication method according to claim 8, wherein, when the first information indicates that the first signal is not to be transmitted in the first transmission and reception mode, the wireless communication method further comprises determining, based on the second information, whether or not to transmit the first signal in the second transmission and reception mode.

12. The wireless communication method according to claim 11, wherein, when the second information indicates that the first signal is permitted to be transmitted in the second transmission and reception mode, the second information further indicates at least one of:

the second subband, a modulation method and a coding method of the second transmission and reception mode, or a transmission power setting of the second transmission and reception mode.

13. The wireless communication method according to claim 12, wherein the transmission power setting of the second transmission and reception mode is based on a positional relationship between surrounding wireless communication devices.

14. The wireless communication method according to claim 8, wherein a format of the concatenated first preamble and first payload is the same as a format of the concatenated second preamble and second payload.

15. A wireless communication terminal, comprising:
a communication control circuit configured to:
exchange information with a central control device;
receive a first portion of a first preamble of a first signal,
the first portion forming a first part of the first signal,
the first part occupying all of a specific frequency
band:
based on the information exchanged with the central
control device and the first portion, make a determi-
nation whether to receive one of:
a second portion of the first preamble and a corre-
sponding first payload that is concatenated with
the second portion so as to form a second part of
the first signal that is concatenated with the first
part, the second part assigned to a first subband of
the specific frequency band, or
a second preamble of the first signal that is concat-
enated with a corresponding second payload, the
concatenated second preamble and second pay-
load assigned to a second subband of the specific
frequency band different from the first subband;
and
based on the determination, receive one of the second
part of the first signal or the concatenated second
preamble and second payload.
16. The wireless communication device according to
claim 15, wherein, when the information exchanged with the
central control device and the first portion indicate that the
second part of the first signal is to be received, the first
portion further indicates at least one of:
the first subband, or
a modulation method and a coding method of the second
part of the first signal.
17. The wireless communication device according to
claim 15, wherein, when the information exchanged with the
central control device and the first portion indicate that the
concatenated second preamble and second payload is to be
received, the first portion further indicates at least one of:
the second subband, or
a modulation method and a coding method of the con-
catenated second preamble and second payload.
18. The wireless communication device according to
claim 15, wherein a format of the concatenated first pre-
amble and first payload is the same as a format of the
concatenated second preamble and second payload.
19. A wireless communication method performed by a
wireless communication device, the wireless communica-
tion method comprising:

24 exchanging information with a central control device:
receiving a first portion of a first preamble of a first signal,
the first portion forming a first part of the first signal,
the first part occupying all of a specific frequency band;
based on the information exchanged with the central
control device and the first portion, making a determi-
nation whether to receive one of:
a second portion of the first preamble and a correspond-
ing first payload that is concatenated with the second
portion so as to form a second part of the first signal
that is concatenated with the first part, the second
part assigned to a first subband of the specific
frequency band, or
a second preamble of the first signal that is concat-
enated with a corresponding second payload, the
concatenated second preamble and second payload
assigned to a second subband of the specific fre-
quency band different from the first subband; and
based on the determination, receiving one of the second
part of the first signal or the concatenated second
preamble and second payload.
20. The wireless communication method according to
claim 19,
wherein, when the information exchanged with the central
control device and the first portion indicate that the
second part of the first signal is to be received, the first
portion further indicates at least one of:
the first subband, or
a modulation method and a coding method of the second
part of the first signal.
21. The wireless communication method according to
claim 19,
wherein, when the information exchanged with the central
control device and the first portion indicate that the
concatenated second preamble and second payload is to
be received, the first portion further indicates at least
one of:
the second subband, or
a modulation method and a coding method of the con-
catenated second preamble and second payload.
22. The wireless communication method according to
claim 19, wherein a format of the concatenated first pre-
amble and first payload is the same as a format of the
concatenated second preamble and second payload.

* * * * *